US009122983B2

(12) United States Patent
Kates et al.

(10) Patent No.: US 9,122,983 B2
(45) Date of Patent: Sep. 1, 2015

(54) METHOD FOR MODEL CONSTRUCTION FOR A TRAVEL-TIME DATABASE

(71) Applicant: Bayerische Motoren Werke Aktiengesellschaft, Munich (DE)

(72) Inventors: Ronald Kates, Otterfing (DE); Heidrun Belzner, Seefeld (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/460,979

(22) Filed: Aug. 15, 2014

(65) Prior Publication Data
US 2015/0046387 A1  Feb. 12, 2015

Related U.S. Application Data

(63) Continuation of application No. PCT/EP2013/052465, filed on Feb. 7, 2013.

(30) Foreign Application Priority Data

Feb. 17, 2012  (DE) .......... 10 2012 202 463

(51) Int. Cl.
*G06N 5/00* (2006.01)
*G06F 1/00* (2006.01)
*G06N 7/00* (2006.01)
*G08G 1/01* (2006.01)
*G06F 17/30* (2006.01)

(52) U.S. Cl.
CPC .......... *G06N 7/005* (2013.01); *G06F 17/30345* (2013.01); *G08G 1/0112* (2013.01); *G08G 1/0129* (2013.01); *G08G 1/0141* (2013.01)

(58) Field of Classification Search
CPC ............ G06N 5/048; G06N 5/04; G06N 5/02
USPC .......................................... 706/52
See application file for complete search history.

(56) References Cited

U.S. PATENT DOCUMENTS

| 4,361,202 A * | 11/1982 | Minovitch ............ 180/168 |
| 2003/0093187 A1 * | 5/2003 | Walker ............ 701/1 |
| 2005/0093720 A1 | 5/2005 | Yamane et al. |
| 2008/0004789 A1 | 1/2008 | Horvitz et al. |
| 2009/0319172 A1 | 12/2009 | Almeida et al. |
| 2011/0082636 A1 | 4/2011 | Barker et al. |
| 2011/0320113 A1 | 12/2011 | Tate, Jr. |
| 2013/0318002 A1 * | 11/2013 | Tomiyama et al. ........ 705/338 |

FOREIGN PATENT DOCUMENTS

| DE | 10 2011 104 838 A1 | 12/2011 |
| EP | 2 071 287 A2 | 6/2009 |
| WO | WO 02/45046 A2 | 6/2002 |
| WO | WO 2009/116105 A2 | 9/2009 |

OTHER PUBLICATIONS

International Search Report (PCT/ISA/210) dated Jun. 28, 2013 with English translation (seven pages).
German-language Search Report dated Jan. 24, 2013 with partial English translation (10 pages).
Nadi S. "Multi-criteria, personalized route planning using quantifier-guided ordered weighted averaging operators" Jan. 5, 2011, pp. 322-335, vol. 13, International Journal of Applied Earth Observation and Geoinformation.
International Preliminary Report on Patentability (PCT/IB/326 & PCT/IB/373), including Written Opinion (PCT/ISA/237) dated Aug. 28, 2014 (Twelve (12) pages).

* cited by examiner

*Primary Examiner* — Alan Chen
*Assistant Examiner* — Kalpana Bharadwaj
(74) *Attorney, Agent, or Firm* — Crowell & Moring LLP

(57) ABSTRACT

According to a method for creating a model for a travel time database, a leg network comprising leg sections between a starting point and a destination point are analyzed. Multiple routes are ascertained between the starting and destination points. Each leg section of a route is associated with a relative travel time loss and is weighted. The ascertained travel time losses and the associated weightings are used as input data for a learning method by way of which an existing knowledge base is iteratively expanded.

11 Claims, No Drawings

METHOD FOR MODEL CONSTRUCTION FOR A TRAVEL-TIME DATABASE

CROSS REFERENCE TO RELATED APPLICATIONS

This application is a continuation of PCT International Application No. PCT/EP2013/052465, filed Feb. 7, 2013, which claims priority under 35 U.S.C. §119 from German Patent Application No. 10 2012 202 463.8, filed Feb. 17, 2012, the entire disclosures of which are herein expressly incorporated by reference.

BACKGROUND AND SUMMARY OF THE INVENTION

The invention relates to a method for creating a model for a travel time database, wherein the model indicates a probability distribution of relative travel time losses on a leg section of a leg network.

Providers offering traffic information data are not always able to draw on a statistically adequate database of current data for the generation of current traffic information. For this reason, historical time variation curves, which are created as a function of traffic characteristics, play an important role. Traffic characteristics shall be understood to mean characteristic state variables that have decisive influence on a travel time experienced on a road section. Such characteristic state variables are the time of day, the date, vacation times and other relevant time features, for example, as well as prevailing road weather features, known traffic management measures, such as the switching of a traffic management system, construction sites, accidents, major events and other special situations.

However, so as to create a historical knowledge base for generating traffic information, it is necessary to record an adequate statistical number of data points per road section. This is not possible alone by driving the routes. Automatically collected vehicle data, however, can be used to create an intelligent knowledge base in a back end. Traffic data, such as a travel time or a travel speed, observed on a leg section by a vehicle when passing through this leg section, in particular can be used to update existing knowledge of a travel time database. The back end can be a vehicle in which a travel time database is stored so as to be able to access the same as needed by way of a computer in the vehicle. However, the knowledge base for the travel time database can also be created by a service provider.

It is desirable to provide a method for creating a model for a travel time database in which the traffic data recorded in a vehicle when passing through a leg section can be used to create a model for the travel time database.

One embodiment of a method for creating a model for a travel time database comprises the following steps:

providing a leg network having leg sections between a starting point and a destination point;

ascertaining a plurality of possible routes between the starting point and the destination point, wherein each route comprises leg sections that include at least one of the leg sections of the leg network;

ascertaining a respective relative travel time loss for each leg section of each route with a particular traffic characteristic on each leg section of each route;

associating the ascertained relative travel time losses of the leg sections of the routes with each leg section of the leg network;

ascertaining a respective weighting of the relative travel time losses for each leg section of each route with a particular traffic characteristic on each leg section of each route;

associating the ascertained weightings of the leg sections of the routes with each leg section of the leg network; and ascertaining a probability distribution of the relative travel time losses for each leg section of the leg network with the traffic characteristic associated with the respective leg section and a calibration parameter associated with the respective leg section.

In the described method, multiple possible routes are estimated between each starting point and destination point, hereinafter referred to as a point pair, and these are stochastically weighted. So as to ascertain the relative travel time loss on leg sections of the distance between the starting and destination points, it is possible, for example, to use known values of a free speed on the leg sections, which are known from a digital map, for example, for subdividing the travel time of a vehicle on a predefined route. The relative travel time losses ascertained on the leg sections are used as input data for a learning method, which in one possible embodiment iteratively expands the knowledge base for an existing travel time database. It is thus possible to utilize data generated in the vehicle so as to create an intelligent knowledge base for the travel time in the back end.

The point data automatically generated in the vehicle are representative and suitable for creating a historical travel time database. The described method can be used to estimate the possible unknown routes between a point pair. Moreover, the method teaches how the knowledge of this lack of precision can be used in the storage of travel times.

The invention will be described in more detail hereafter based on exemplary embodiments.

DETAILED DESCRIPTION OF THE EXEMPLARY EMBODIMENTS

A travel time database shall be understood to mean a knowledge base for travel times on leg sections of a route between a starting point and a destination point forming a point pair. The travel time knowledge base stored in the travel time database is to make it possible, if needed, to conclude a probability density $F(u|A,C;\lambda)$ that a vehicle on a leg section A experiences the proportional delay or the relative travel time loss u at $$u = V_{free}(A)/V - 1 \qquad (1)$$

In the described formula expression for the relative time delay, $V_{free}(A)$ denotes the free speed on the leg section A, and V denotes the speed actually experienced on the leg section by the vehicle. Assuming that the section length of a leg section and the free speed on the leg section are known from a digital map, $F(u|A,C;\lambda)$ would also determine the probability distribution of the travel time.

In the expression $F(u|A,C;\lambda)$ indicated for the probability density, the parameter C denotes traffic characteristics that can be collected for the leg section A and on which the probability density can likewise depend. These include, for example, the day of time, the day of the week, as well as vacation times and other relevant temporal characteristics. The traffic characteristics C likewise capture road weather characteristics, traffic management measures, construction sites, accidents, major events and other special situations.

In the formula expression for the probability density $F(u|A, C;\lambda)$, the parameter X denotes one or more calibration parameters, on which the probability density function could likewise depend. In this way, for example, the percentage of the intentionally driven indirect routes between the starting point P and the destination point Q assumed in the creation of the model can be captured.

In the method, the knowledge base is to be updated with new observation data that are recorded when the vehicle passes through a route according to a statistical method. A Bayesian approach is used for this purpose. Positions and speeds of the vehicles, as well as geographical longitudes and latitudes, links, driving direction and offset are recorded and transmitted at regular intervals, such as every 5 minutes. However, no so-called "pearl chain", which is to say data from shorter intermediate intervals within the regular intervals, is transmitted. The transmitted position data form the above-described point pairs, of which the starting point P and the destination point Q represent only one example.

Since the position data are transmitted randomly, the associated point pairs constitute representative random samples from the located point pairs of vehicles for which a plausibility check has been carried out. However, generally no exact reconstruction of the driven leg between the points is possible based on the point pairs. Rather, different routes between the points are possible. This aspect essentially makes the use for statistical purposes enormously more difficult.

Initially, one embodiment of an algorithm is described, which makes it possible to subdivide a travel time associated with a point pair P→Q into leg sections of a route between the starting point P and the destination point Q. Known values of the free speed $V_{free}$, which are known from a digital map, for example, and associated with individual leg sections of the route, are used for this purpose. A possible route R(P→Q) between points P and Q, for example, comprises i leg sections $A_i$, where i=1, ..., n, which is to say leg sections $A_1, A_2, ... A_n$, for example. Each leg section has a beginning point and an ending point. Moreover, different road classes and values of the free speed $V_{free}$ can potentially be associated with the leg sections $A_i$.

Looking at the route associated with the point pair P→Q, the starting point P on the first leg section $A_1$ can have an offset $x_1$ from the beginning point of the first leg section. On the last section $A_n$, the destination point Q can have the offset $x_n$ in relation to the beginning point of the last leg section $A_n$. The travel time measured when the route R is passed from P to Q is referred to hereinafter as $T_{PQ}$. Assuming that the minimum travel time $T_{min}$ between the starting and destination points, as it can be found on a digital map, for example, is shorter than the travel time $T_{PQ}$ measured when passing the route from P to Q, the following condition results:

$$T_{min}(P \rightarrow Q;R) < T_{PQ}(P,Q) \quad (2)$$

The relative travel time loss $u_i$ for all i leg sections on the route R is defined as $$u_i(R) \equiv \frac{T_{PQ}(P, Q)}{T_{min}(P \rightarrow Q; R)} - 1, i = 1, \ldots, n \quad (3)$$

The minimum travel time $T_{min}$ is $$T_{min}(P \rightarrow Q; R) \equiv \sum_{i=1}^{n} T_{free, i} \quad (4)$$

The parameter $T_{free,i}$ indicates the free travel time on a leg section $A_i$. When $L(A_i)$ denotes the length of the leg section $A_i$, and with the offsets $x_1$, $x_n$, the free travel time on the first leg section results as $$T_{free,1} \equiv \frac{L(A_1) - x_l}{V_{free,n}} \quad (5)$$

and the free travel time on the nth leg section results as $$T_{free,n} \equiv \frac{x_n}{V_{free,n}}. \quad (6)$$

On the remaining i leg sections, the free travel time results as $$T_{free,i} \equiv \frac{L(A_i)}{V_{free,n}}; i = 2, \ldots, n-1 \quad (7)$$

If the assumption is violated, the relative travel time loss is defined as $$u_i = 0; i = 1, \ldots, n \quad (8)$$

Except for i=1 and i=n, the respective values of $T_{free,i}$, and thus also all $u_i$, can depend on the predefined route R.

The following describes two possible embodiments of algorithms for a route and travel time association with a point pair P→Q. The starting basis that is provided for both algorithms is a leg network comprising leg sections $A_i$, between a starting point P and a destination point Q of the point pair. Initially, a plurality of possible routes $R_k$ between the starting point P and the destination point Q are ascertained, wherein each route $R_k$ comprises leg sections $A_{i,k}$, which include at least one of the leg sections $A_i$. A respective relative travel time loss $u_{i,k}$ is then ascertained for each leg section $A_{i,k}$ of each route $R_k$ with a respective traffic characteristic $C_a$ on each leg section $A_{i,k}$ of each route $R_k$. Hereinafter, each leg section $A_i$ of the leg network H is associated with the ascertained relative travel time loss $u_{i,k}$ of the leg sections $A_{i,k}$ of the routes $R_k$. Thereafter, a respective weighting $W_{i,k}$ of the relative travel time losses $u_{i,k}$ is ascertained for each leg section $A_{i,k}$ of each route $R_k$ with a respective traffic characteristic $C_{i,k}$ on each leg section $A_{i,k}$ of each route $R_k$. Each leg section $A_i$ of the leg network H is associated with the ascertained weightings $W_{i,k}$ of the leg sections $A_{i,k}$ of the routes $R_k$.

The two algorithms are described in detail hereafter.

In a first embodiment of the algorithm, the plurality of possible routes $R_k$ and the relative travel time losses $u_{i,k}$ on the respective leg sections $A_{i,k}$ of the routes $R_k$ are ascertained by way of the following steps:

In the first step, the temporally shortest route $R_0$ having leg sections $A_{i,0}$ where i=1, ..., n is ascertained by evaluating a predefined travel time database. In the second step, for i=1, ..., n the relative travel time losses $u_{i,0}$ of the respective leg sections $A_{i,0}$ of the temporally shortest route $R_0$ are ascertained by way of the above-described equations (3) to (7). Thereafter, in a third step, the resistances of the respective leg sections $(A_{i,0})$ of the route $R_0$ are increased. The expression "resistance of a leg section" denotes a fictitious travel time associated with the leg section, for example.

In a fourth step, the temporally initially shortest route $R_1$ compared to the previously determined route $R_0$ which can be associated with the point pair P→Q is ascertained. In a subsequent fifth step, the relative travel time losses $u_{i,1}$ of the respective leg sections $A_{i,1}$ of this temporally initially shortest route $R_1$ are ascertained according to the above-described equations (3) to (7). Thereafter, in a sixth step, the resistances of the leg sections $A_{i,1}$ of the route $R_1$ are increased.

Steps four to six are now repeated until no found route fulfills equation (2) any more, which is to say that for none additionally found route the respective minimum travel time $T_{min}$ is shorter than the travel time $T_{PQ}$ measured on the route. In this way, k routes $R_k$ are found and respective relative travel time losses $u_{i,k}$ are associated with the respective sections $A_{i,k}$. Generally, it is to be expected that only few substitute routes fulfill the condition of equation (2). If no travel time database is available, the routes can also be determined by way of a digital map and the free travel times.

So as to ascertain the weightings $W_{i,k}$ of the relative travel time losses $u_{i,k}$, initially expected travel time values $T(R_k)$ are determined for each of the ascertained routes $R_k$. The respective weighting $W_{i,k}$ of the relative travel time losses $u_{i,k}$ is ascertained as a function of the previously determined expected travel time values $T(R_k)$. The weightings $W_{i,k}$ can be determined by way of a monotonically decreasing function. For example, the function can be selected in such a way that the weightings $W_{i,k}$ tend to zero for small expected travel time values $T(R_k)$ and take on the largest value for the weightings for large expected travel time values. All leg sections $A_i$ of the differently observed routes $R_k$ can be associated with the weightings $W_{i,k}=W(R_k)$ as follows:

$$W(R_k)=D \cdot \exp[-\lambda T(R_k)] \quad (9)$$

$$W(R_k)=D \cdot \exp[-\lambda (T_{PQ}-T(R_k))] \quad (10)$$

where the constant D can be determined with $$\Sigma_k w(R_k)=1 \quad (11)$$

The constant $\lambda$ is the calibration parameter that was already mentioned in connection with the probability density function $F(u|A,C;\lambda)$. It can be established as a function of the road class, for example. For travel times in minutes, the calibration parameter $\lambda$ can be set at $\lambda=1$ minute$^{-1}$, for example. This means that travel time deviations by one minute lower the weight by the factor 1/e.

A second algorithm, which is based on a stochastic route and travel time association and entails automatic weighting, will be described below. The algorithm will again be described based on the point pair P→Q.

Initially, with the help of an existing travel time database, a probability distribution $F_0(u_i|A_i,C_i;\lambda_i)$ of relative travel time losses $u_i$ is ascertained for each leg section $A_i$ of the leg network H with a respective traffic characteristic C, on each leg section $A_i$ of the leg network. By repeating, such as 1000 times, the steps I to III described hereafter, a plurality of possible routes $R_k$ and the respective relative travel time losses $u_{i,k}$ on each leg section $A_{i,k}$ of these routes $R_k$ are ascertained.

In step I, random (stochastic) travel times are ascertained from the probability distribution $F_0(u_i|A_i,C_i;\lambda_i)$ of relative travel time losses $u_i$ for each leg section $A_i$ of the leg network H. Each leg section $A_i$ of the leg network H is associated with one of the randomly ascertained travel times. In step II then, a temporally shorted route $R_k$ between the starting point P and the destination point Q is ascertained based on the travel times associated with the leg sections $A_i$ of the leg network H. The number of leg sections $A_{i,k}$ of each route $R_k$ can depend on the respective route $R_k$. In step III, the relative travel time losses $u_{i,k}$ of the respective leg section $A_{i,k}$ of the temporally shortest route $R_k$ are ascertained. The travel time losses can be ascertained by way of equations (3) to (7), for example. The travel time losses $u_{i,k}$ are independent of the travel times randomly generated by the above-mentioned probability model.

According to one possible embodiment, the relative travel time losses of the first and the last leg sections of each of the routes $R_k$ can remain without consideration when associating the respective relative travel time losses $u_{i,k}$ of the leg sections $A_{i,k}$ of routes $R_k$ with the leg sections $A_i$ of the sub-network H. The undesired influence of intentional detours on the method can thus be reduced. This shall be illustrated based on the following example.

When a vehicle covers a particularly short geometric distance between the points P and Q of the point pair P→Q within the transmission interval $T_{PQ}$, multiple hypotheses about the driver and the trip are possible. The driver could have intended to drive directly from P to Q and has (consciously or unconsciously) taken the "optimal route" (based on empirical data). However, an unexpected unfavorable traffic condition ("congestion") was present. It would also be possible that the driver had the intention to drive directly from P to Q, however took a "suboptimal" route according to existing historical data, wherein the traffic condition was also worse than existing historical median values, but less severely than in the first case. The traffic condition on the "optimal" route was "normal". Another possibility could be that the driver briefly became lost or picked the wrong lane, necessitating him to turn around or take another detour. The traffic condition on the "optimal" route was "normal". During another possible case configuration, the driver could have intentionally reached the destination point Q via a detour, without this detour necessarily having been detectable, such as by the shutting down of the engine or the opening of a door. Here, the individual travel times associated with the sections corresponded to the expected historical values.

In the described scenario of examples, congestion on the optimal route can only be concluded in the first case. It is now likewise reasonable to assume that at least intentional detours take place primarily at the beginning and at the end of a cohesive route, and that overall detours of less than a certain minimum time, such as a time period of 5 minutes, occur relatively rarely. As a result, if the first and last point pairs of a cohesive trip are excluded, the probability that a detour was taken decreases significantly.

The above-described second embodiment of the algorithm ultimately discovers k routes $R_k$ for a point pair P→Q. Relative travel time losses $u_{i,k}$ are associated with the respective sections $A_{i,k}$ of the k routes $R_k$ by way of equations (3) to (7). While the k routes $R_k$ (P→Q) can be deterministically determined with definition of the travel times in the leg network, they generally differ due to the random selection of travel times, which is intended to model the behavior of k random customers, and are stochastic.

To ascertain the weightings $W_{i,k}$ of the relative travel time losses $u_{i,k}$, each value of the relative travel time loss can be weighted using the factor 1/k, which is to say a factor that is proportional to the reciprocal of the number of repetitions of steps I to III, or proportional to the reciprocal of the number of customers k.

After different routes $R_k$ whose leg sections $A_{i,k}$ have each been associated with relative travel time losses $u_{i,k}$ have now been ascertained as the result of the two algorithms k, traffic characteristics $C_{i,k}$ are now associated with the relative travel time losses $u_{i,k}$.

Each leg section $A_i$ in the leg network H is thus now assigned all the values $u_{i,k}$ associated with the section $A_i$ in a list $Q_i$, which of course can also be an empty list if no route at all passes through a leg section $A_i$. Each leg section $A_i$ of the leg network H is thus assigned a number m of respective relative travel time losses $u_{i,k}$ for each leg section $A_i$ of the leg network H.

Likewise, each leg section $A_i$ in the leg network H can be assigned all the values of weightings $W_{i,k}$ associated with the section $A_i$. Each leg section $A_i$ of the leg network H is thus assigned a number m of respective weightings $W_{i,k}$ for each leg section $A_i$ of the leg network H.

To create a model for the knowledge base of the travel time database, categories of the traffic characteristics are defined so that the relevant model can be obtained by way of a look-up table upon definition of leg sections $A_i$ with characteristics $C_{i,k}$. According to the two above-described algorithms for route and travel time association, multiple values $u_{i,k}$ of the relative travel time loss and of the associated weightings $W_{i,k}$ result on a leg section $A_i$ with characteristics $C_{i,k}$ for each point pair. For the stochastic association, m such value pairs $\{u_{i,k}, W_{i,k}\}$ result per point pair and leg section. Each value pair is now input separately as input data for the knowledge base for the relative travel time loss on a leg section $A_i$ with characteristics $C_{i,k}$.

The values that are already present in the knowledge base are updated for each new data set m from the association method by way of a learning algorithm. The notation $\{u(i,C,m), W(i,C,m)\}$ is used to simplify the formulas described hereafter. This denotes the mth value pair {relative delay, weighting}, which refers to the ith leg section and the category C of traffic characteristics.

In a first method step of the learning method, a normal distribution $N(\hat{u}(i,C,m), \sigma^2(i,C,M))$ is assumed for the relative travel time loss on a leg section $A_i$ with characteristics C at the iteration stage m, wherein the parameter $\hat{u}(i,C,m)$ indicates the estimated mean value of the relative travel time loss, and the parameter $\sigma^2(i,C,M)$ indicates the estimated variance of the distribution of the relative travel time loss. The parameters $\hat{u}(i,C,m)$, $\sigma^2(i,C,M)$ can be determined using the following iteration formulas:

$$\hat{u}(i, C, m) \equiv \frac{(N(i, C, m-1) \cdot \hat{u}(i, C, m-1) + W(i, C, m) \cdot u(i, C, m)}{N(i, C, m)}, \quad m \geq 2 \quad (12)$$

$$\sigma^2(i, C, m) \equiv \frac{(N(i, C, m-1) \cdot \sigma^2(i, C, m-1) + W(i, C, m) \cdot r^2(i, C, m)}{N(i, C, m)}, \quad m \geq 3 \quad (13)$$

where $$r(i, C, m) \equiv u(i, C, m) - \hat{u}(i, C, m-1), \quad m \geq 3 \quad (14)$$

$$N(i, C, m) = N(i, C, m) + W(i, C, m), \quad m \geq 2 \quad (15)$$

The initial values of the iteration method can be determined as follows, for example:

$$\sigma^2(i, C, 2) = [u(i, C, 2) - u(i, C, 1)]^2 \quad (16)$$

$$\hat{u}(i, C, 2) \equiv \frac{W(i, C, 1) \cdot u(i, C, 1) + W(i, C, 2) \cdot u(i, C, 2)}{W(i, C, 1) + W(i, C, 2)} \quad (17)$$

$$N(i, C, 1) = W(i, C, 1) \quad (18)$$

$$\hat{u}(i, C, 1) = u(i, C, 1) \quad (19)$$

$$\sigma^2(i, C, 1) = [u(i, C, 1)]^2 \quad (20)$$

The iteration method can be used to determine the estimated mean value of the relative travel time losses $\hat{u}(i,C,m)$ as a function of a respective number m of relative travel time losses $u_{i,k}$ and weightings $W_{i,k}$, which have been associated with each leg section $A_i$ of the leg network H with the respective traffic characteristic $C_i$ on the leg section $A_i$.

In a subsequent method step, the mean values $\hat{u}(i,C,m)$ of the relative travel time losses estimated by way of the iteration method and the weightings $W(i,C,m)$ on a leg section $A_i$ can be used to conclude corresponding input data $\hat{u}(i,C,m)$ and $M(i,C,m)$ for a suitable model of a probability distribution of relative travel time losses $F(u_i|A_i,C_i;\lambda_i)$ using the gamma distribution. The parameter M here indicates a measure of the virtual number of random samples associated with an information source. The parameter $M(i,C,m)$ can be ascertained as a function of the respective number m of relative travel time losses $u_{i,k}$ and weightings $W_{i,k}$, which have been associated with each leg section $A_i$ of the leg network H with the respective traffic characteristic $C_i$ on the leg section $A_i$.

If a gamma distribution is assumed as a suitable model, it is possible for the probability distribution of the travel time losses $u_i$ on a leg section $A_i$ with a prevailing traffic characteristic $C_i$ and a calibration parameter $\lambda_i$, to apply the probability density function as $$F(u_i \mid A_i, C_i; \lambda_i) \equiv F(u; B, a) = \frac{B^a u^{a-1} \exp(-Bu)}{\Gamma(a)} \quad (21)$$

In the present model, the parameter a in the right formula expression corresponds to the calibration parameter $\lambda$. This can be assumed to be known for a leg section. For example, for grade-separated roads it can be assumed $$a = 100$$

and for at-grade roads it can be assumed $$a \approx 0.09 * T$$

where T denotes the characteristic travel time (in seconds) between points of intersection of the observed road class. In a general embodiment, the parameter a can be ascertained from the coefficient of variation estimated on a leg section, which in turn can be obtained from the relationship between a standard deviation and the mean value of a distribution of the travel times on a leg section.

In contrast, the parameter B is considered to be a fuzzy variable and, in turn, is described with the aid of a probability distribution.

$$P_I(B) = \frac{\beta^{a_I} B^{a_I-1} \exp(-\beta_I B)}{\Gamma(a_I)}, \quad I = 0, 1, 2, \ldots \quad (22)$$

Here, the parameter B denotes the reciprocal scaling parameter of a gamma distribution. The parameters $\alpha_I$ and $\beta_I$ are referred to as "hyperparameters", which can be ascertained as a function of the input data $\hat{u}(i,C,m)$ and $M(i,C,m)$ based on the following equations (23) and (24):

$$\alpha_I = \alpha_{I_1} + \alpha_{(I)} \, mit\alpha_{(I)} \equiv M_I \cdot \alpha \quad (23)$$

and $$\beta_I = \beta_{I_1} + \beta_{(I)} \, mit\beta_{(I)} \equiv M_I \cdot \hat{u}_I \quad (24)$$

The parameter I=0, 1, 2, ... indicates the associated information source.

In a preferred embodiment of the learning method, data points $u_{1,k}$ and $W_{i,k}$ can be removed using an outlier filter. This has the advantage that outliers of relative travel time losses $u_{i,k}$ of the leg sections $A_{i,k}$ of the routes $R_k$ remain without consideration in the ascertainment of the estimated mean value of the relative travel time losses û(i,C,m). The residue r(i,C,m) ascertained in equation (14) as part of the iteration method can be used as a criterion for an outlier. If the magnitude of the residue r(i,C,m) for the mth iteration step is greater than 4·σ, for example, where σ is the root of the variance calculated in equation (13), (16) or (20), the corresponding value pair $\{u_{i,k}; W_{i,k}\}$ is not considered in the execution of the iteration method.

In the presented method, multiple routes between a starting point and a destination point are analyzed for use with a travel time database, and respective probabilities are associated therewith. These are then used as weighted information for the learning of a knowledge base. If a structural change is detected, the learning method can be restarted.

The method can be stored on an electronic data carrier or in the firmware of a data processing device as a program algorithm. The described method steps can be carried out by a processor of a computer. The data recorded in the vehicle can be transmitted to a service provider. A computer that has access to the program algorithm stored on the electronic data carrier or in the firmware is able to carry out the described method so as to create a travel time database by a traffic services provider, or so as to update an existing database. It is thus possible to utilize data generated in the vehicle so as to create an intelligent knowledge base for the travel time in the back end.

The invention claimed is:

1. A method for creating a model for a travel time database, comprising:
   providing a leg network comprising leg sections between a starting point and a destination point;
   ascertaining a plurality of possible routes between the starting point and the destination point, wherein each route comprises leg sections including at least one of the leg sections of the leg network;
   ascertaining a respective relative travel time loss for each leg section of each route with a respective traffic characteristic on each leg section of each route;
   associating the ascertained relative travel time losses of the leg sections of the routes with each leg section of the leg network;
   ascertaining a respective weighting of the relative travel time losses for each leg section of each route with a respective traffic characteristic on each leg section of each route;
   associating the ascertained weightings of the leg sections of the routes with each leg section of the leg network; and
   ascertaining a probability distribution of the relative travel time losses for each leg section of the leg network with the traffic characteristic associated with the respective leg section and a calibration parameter associated with the respective leg section,
   wherein the respective relative travel time loss is ascertained as a function of the travel time measured between the starting point and the destination point and a minimum travel time predefined on the respective leg section of each route between the starting point and the destination point,
   wherein the minimum travel time between the starting point and the destination point is ascertained from a sum of respective free travel times associated with the leg sections of the route, and
   wherein a free travel time associated with the respective leg section is ascertained as a function of the length of the respective leg section of the route and the free travel speed associated with the respective leg section of the route.

2. The method according to claim 1,
   wherein the free travel speed associated with the respective leg section of the route is obtained from a digital map.

3. The method according to claim 1, further comprising:
   ascertaining the plurality of possible routes and the relative travel time losses on the respective leg sections of the routes using the following acts (a) to (d):
   (a) ascertaining a temporally shortest route comprising leg sections by evaluating a predefined travel time database;
   (b) ascertaining the relative travel time losses of the respective leg sections of the temporally shortest route;
   (c) ascertaining further routes comprising respective leg sections, wherein the respective minimum travel time of the further routes is shorter than a travel time measured on the respective further route; and
   (d) ascertaining the relative travel time losses of the respective leg sections of the further routes.

4. The method according to claim 3,
   wherein a resistance of the respective leg sections of the routes is increased after the step of ascertaining the relative travel time loss of the respective leg sections of the routes.

5. A method for creating a model for a travel time database, comprising:
   providing a leg network comprising leg sections between a starting point and a destination point;
   ascertaining a plurality of possible routes between the starting point and the destination point, wherein each route comprises leg sections including at least one of the leg sections of the leg network;
   ascertaining a respective relative travel time loss for each leg section of each route with a respective traffic characteristic on each leg section of each route;
   associating the ascertained relative travel time losses of the leg sections of the routes with each leg section of the leg network;
   ascertaining a respective weighting of the relative travel time losses for each leg section of each route with a respective traffic characteristic on each leg section of each route;
   associating the ascertained weightings of the leg sections of the routes with each leg section of the leg network; and
   ascertaining a probability distribution of the relative travel time losses for each leg section of the leg network with the traffic characteristic associated with the respective leg section and a calibration parameter associated with the respective leg section;
   ascertaining an expected travel time value for each of the ascertained routes; and
   ascertaining the respective weighting of the relative travel time losses for each leg section of each route as a function of the ascertained expected travel time values.

6. A method comprising:
   ascertaining, by a processor of a computer, a probability distribution model of relative travel time losses for each leg section of a leg network with a respective traffic characteristic on each leg section of the leg network by evaluating a predefined travel time database;

ascertaining, by the processor of the computer, a plurality of possible routes and ascertaining the respective relative travel time losses on each leg section of the routes by the processor repeating the following acts (a) to (c) multiple times:

(a) ascertaining a random travel time on each leg section of the leg network by applying the probability distribution model and associating each of a randomly ascertained travel times with each leg section of the leg network;

(b) ascertaining a temporally shortest route between a starting point and a destination point based on the travel times associated with the leg sections of the leg network; and (c) ascertaining the relative travel time losses of the respective leg sections of the temporally shortest route.

7. The method according to claim 6, comprising:

ascertaining, by the processor of the computer, a respective weighting of the relative travel time losses of the leg sections of the routes as a function of a value that is proportional to the reciprocal of the number of multiple repetitions for ascertaining the plurality of possible routes and the relative travel time losses of the leg sections of the routes.

8. The method according to claim 1, wherein the relative travel time losses of a first and a last leg section of each of the routes can remain without consideration when associating the respective relative travel time losses of the respective leg sections of the routes with the leg sections of the sub-network.

9. The method according to claim 1, further comprising:

ascertaining a respective estimated mean value of the relative travel time losses as a function of a respective number of relative travel time losses and weightings that were associated with each leg section of the leg network with the respective traffic characteristic on the leg section.

10. The method according to claim 9, wherein outliers of relative travel time losses of the leg sections of the routes remain without consideration in the ascertainment of the estimated mean value of the relative travel time losses.

11. The method according to claim 1, wherein the probability distribution of the relative travel time losses for each leg section of the leg network is modeled as a gamma distribution.

\* \* \* \* \*